United States Patent
Deng et al.

(10) Patent No.: US 11,736,028 B2
(45) Date of Patent: Aug. 22, 2023

(54) RESONANT CONVERTER, CONTROL CIRCUIT AND CONTROL METHOD

(71) Applicant: Silergy Semiconductor Technology (Hangzhou) LTD, Hangzhou (CN)

(72) Inventors: Jian Deng, Hangzhou (CN); Nan Luo, Hangzhou (CN); Yunlong Han, Hangzhou (CN); Zhaofeng Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 170 days.

(21) Appl. No.: 17/316,902

(22) Filed: May 11, 2021

(65) Prior Publication Data
US 2021/0367525 A1 Nov. 25, 2021

(30) Foreign Application Priority Data
May 20, 2020 (CN) .......................... 202010429582.0

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05)

(58) Field of Classification Search
CPC .......... H02M 3/33592; H02M 1/0058; H02M 3/33571; H02M 3/01
See application file for complete search history.

(56) References Cited

U.S. PATENT DOCUMENTS

| | | | | |
|---|---|---|---|---|
| 9,590,518 | B2 | 3/2017 | Yan | |
| 9,887,633 | B2* | 2/2018 | Choi | H02M 3/01 |
| 10,199,819 | B2* | 2/2019 | Lee | H02M 3/33592 |
| 2020/0336071 | A1* | 10/2020 | Iorio | H02M 3/33592 |

FOREIGN PATENT DOCUMENTS

CN 1825743 A 8/2006

\* cited by examiner

*Primary Examiner* — Adolf D Berhane
*Assistant Examiner* — Afework S Demisse

(57) ABSTRACT

A control circuit for a resonant converter, that is configured to: adjust a conduction time of one power switch and a conduction time of one corresponding synchronous rectifier switch in the resonant converter in a resonant period detection mode; control a resonance current to cross zero twice during the conduction time of the synchronous rectifier switch; and obtain a resonant period of the resonant converter.

20 Claims, 5 Drawing Sheets

RESONANT CONVERTER, CONTROL CIRCUIT AND CONTROL METHOD

RELATED APPLICATIONS

This application claims the benefit of Chinese Patent Application No. 202010429582.0, filed on May 20, 2020, which is incorporated herein by reference in its entirety.

FIELD OF THE INVENTION

The present invention generally relates to the field of power electronics, and more particularly to resonant converters and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Since resonant converters have been widely used due to advantages of soft switching characteristics, high switching frequency, low switching loss, and so on. When the switching frequency of the resonant converter is equal to the natural resonant frequency, the gain of the circuit is constant and the efficiency is the highest. Therefore, in order to realize the switching frequency being equal to the resonant frequency, taking LLC full-bridge resonant converter as an example, a closed-loop control can be adopted. For example, by controlling a drive signal of a synchronous rectifier switch in the secondary side the synchronous rectifier switch to be turned off at the zero crossing of the current flowing through itself, and by controlling the conduction time of a power switch in a primary side, the difference between the conduction time of the power switch in the primary side and the conduction time of the synchronous rectifier switch can be within the preset range. By controlling the switching frequency of the resonant converter through a closed-loop control, the resonant converter can operate at the resonant frequency. However, when the load is light, the current flowing though the synchronous rectifier switch can be advanced to zero, thereby causing the switching frequency at this time to be higher than the resonant frequency. Thus, this approach may not be applicable for light load conditions, and the associated hardware circuitry and control logic can be relatively complicated.

Figure 1:
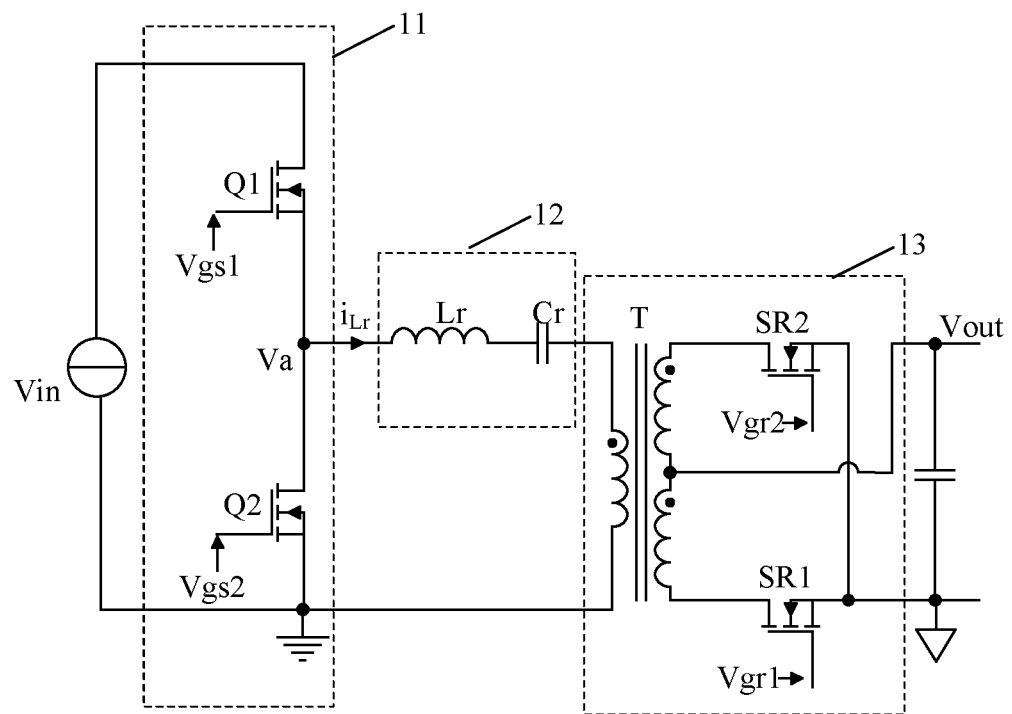
FIG. 1 is a schematic block diagram of an example resonant converter, in accordance with embodiments of the present invention.

Referring now to FIG. 1, shown is a schematic block diagram of an example resonant converter, in accordance with embodiments of the present invention. In this particular example, a half-bridge LLC resonant converter is exemplified, and resonant converter 1 can include main power topology 11, resonant network 12, and rectifier circuit 13. Main power topology 11 can include power switches Q1 and Q2 connected in series between both terminals of input voltage Vin. Resonant network 12 can include resonant inductor Lr and resonant capacitor Cr connected in series between a common node of power switches Q1 and Q2, and one terminal of rectifier circuit 13. Rectifier circuit 13 can include transformer T, synchronous rectifier switch SR1, and synchronous rectifier switch SR2, which can form a full-wave rectifier circuit. Resonant inductor Lr, resonant capacitor Cr, and the winding of transformer may form LLC resonance. Other resonant converters, such as a full-bridge resonant converters, as well as other resonance networks, and other rectifier circuitry in the secondary side, such as a full bridge rectifier circuit composed of synchronous rectifier switches, can be utilized in certain embodiments.

Figure 2:
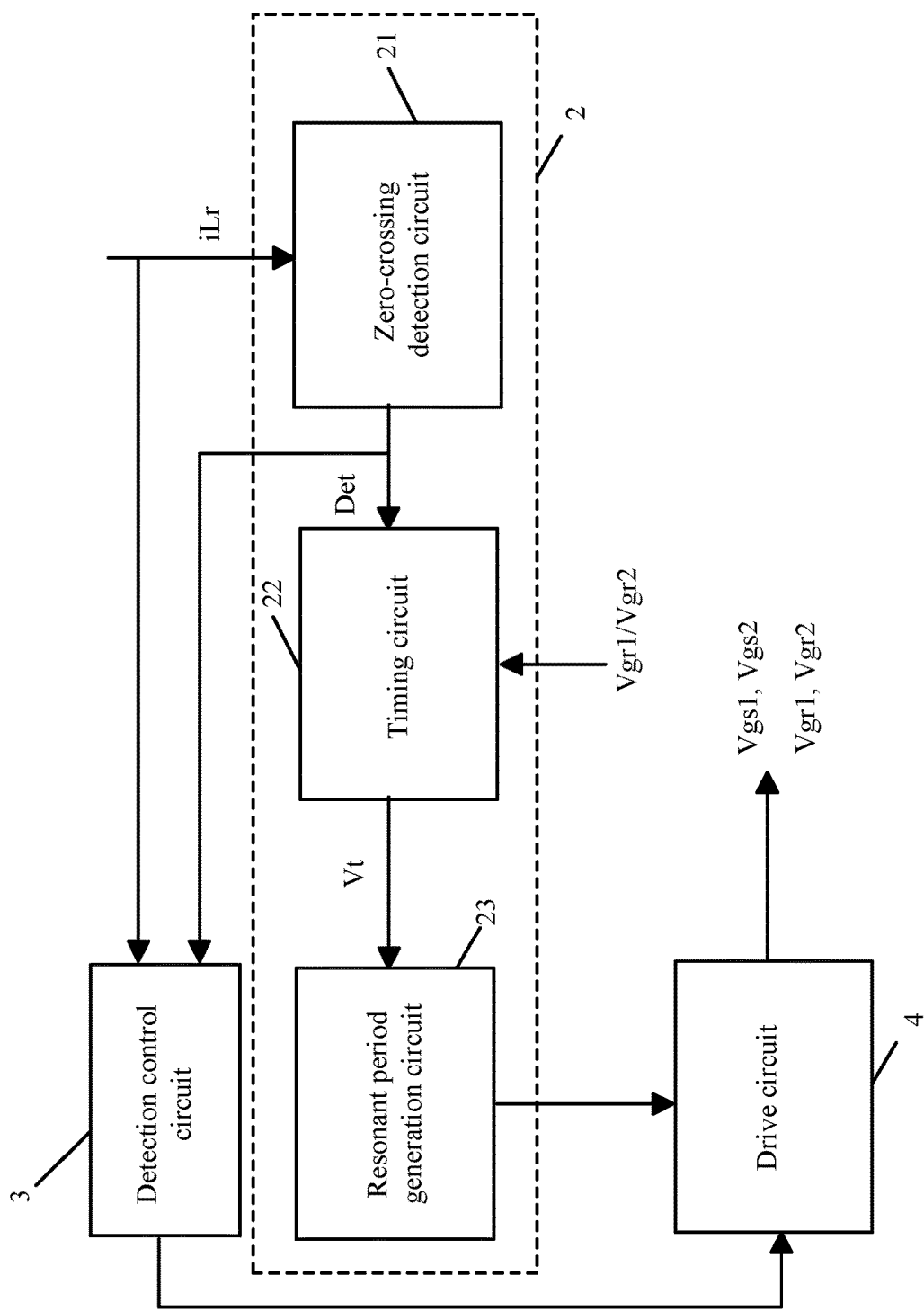
FIG. 2 is a schematic block diagram of an example control circuit, in accordance with embodiments of the present invention.

Referring now to FIG. 2, shown is a schematic block diagram of an example control circuit, in accordance with the embodiments of this invention. This particular example control circuit can include resonant period detection circuit 2, detection control circuit 3, and drive circuit 4. Resonant period detection circuit 2 can obtain a current resonant period Tr of the resonant converter. In this example, resonant period detection circuit 2 can include zero-crossing detection circuit 21, timing circuit 22, and resonant period generation circuit 23. Zero-crossing detection circuit 21 can detect a zero-crossing point of resonance current iLr, and may generate zero-crossing detection signal Det. When zero-crossing detection circuit 21 detects that resonance current iLr is greater than zero, zero-crossing detection signal Det is active, and when zero-crossing detection circuit 21 detects that resonance current iLr is less than zero, zero-crossing detection signal Det can be inactive.

As shown in FIG. 2, a high level of zero-crossing detection signal Det may represent an active level, and a low-level of zero-crossing detection signal Det may represent an inactive level. In other embodiments, a low level of zero-crossing detection signal Det can represent an active level, and a high level of zero-crossing detection signal Det can represent an inactive level. It should be understood that zero-crossing detection circuit 21 may be achieved by other circuits, as long as such circuitry can detect the moment when the resonant current crosses zero. Timing circuit 22 can be controlled to start counting from zero when the synchronous rectifier switch SR1 is turned on and zero-crossing detection signal Det is active, whereby timing signal Vt can rise from zero.

In this embodiment, timing circuit 22 can be triggered to start counting by detecting a rising edge of zero-crossing detection signal Det. It should be understood that if a low level of the zero-crossing detection signal represents an active level, timing circuit 22 can be triggered to start counting by detecting a falling edge of zero-crossing detection signal Det. In a normal operation mode, since resonant current iLr may not drop to less than zero during the period when synchronous rectifier switch SR1 is turned on, timing circuit 22 can be directly cleared to zero when synchronous rectifier switch SR1 is turned off. In a resonant period detection mode, when the falling edge of zero-crossing detection signal Det arrives, timing circuit 221 may stop counting and transmits timing signal Vt to resonant period generation circuit 23, while keeping timing signal Vt unchanged during holding time Th. Here, holding time Th can ensure accurate signal transmission and appropriate update time. Until synchronous rectifier switch SR1 is turned off, timing circuit 221 can clear timing signal Vt to zero, in order to re-count when the next zero-crossing detection signal Det is active.

Resonant period generating circuit 23 can receive timing signal Vt generated by timing circuit 22 when zero-crossing detection signal Det is inactive in the resonant period detection mode, and may obtain current resonant period Tr according to timing signal Vt. Here resonant period Tr can be twice interval time 'Timer' between two zero-crossing points of resonant current iLr during the conduction time of the synchronous rectifier switch, and timing signal Vt at this time can represent interval time 'Timer'. Drive circuit 4 can receive resonant period Tr generated by resonant period generation circuit 23, and may control switching period Ts to be equal to resonant period Tr, such that the switching frequency is equal to the resonant frequency. Further, drive circuit 4 can generate drive signals Vgs1 and Vgs2 according to the updated switching frequency to control the switching states of power switches Q1 and Q2 respectively, and may generate drive signals Vgr1 and Vgr2 to respectively control synchronous rectifier switch SR1 and synchronous rectifier switch SR2.

In some embodiments, drive signal Vgs1 can be the same as drive signal Vgr1, and drive signal Vgs2 may be the same as drive signal Vgr2. In this embodiment, in order to ensure that power switches Q1 and Q2 achieve soft switching when the switching frequency is less than the resonant frequency, the rising edge of drive signal Vgr1 can be consistent with (e.g., the same as) drive signal Vgs1, and the falling edge of drive signal Vgr1 may be ahead of the falling edge of drive signal Vgs1 by a dead time. In addition, the rising edge of drive signal Vgr2 can be consistent with drive signal Vgs2, and the falling edge of drive signal Vgr2 is ahead of the falling edge of drive signal Vgs2 by a dead time. That is, synchronous rectifier switch SR1 and power switch Q1 can be turned on at the same time, and synchronous rectifier switch SR1 may be turned off before power switch Q1 by a dead time.

In addition, synchronous rectifier switch SR2 and power switch Q2 can be turned on at the same time, and synchronous rectifier switch SR2 may be turned off before power switch Q2 by a dead time. Further, a dead time may also be set between drive signals Vgs1 and Vgs2. The sum of the conduction time and the dead time of power switch Q1 can be half of the switching period, and the sum of the conduction time and the dead time of power switch Q2 may be half of the switching period. In this embodiment, detection control circuit 3 can control the resonant converter to enter the resonant period detection mode, and to adjust the conduction time of the power switch and the synchronous rectifier switch, such that the resonant current can cross zero twice during the conduction time of the synchronous rectifier switch.

Figure 3:
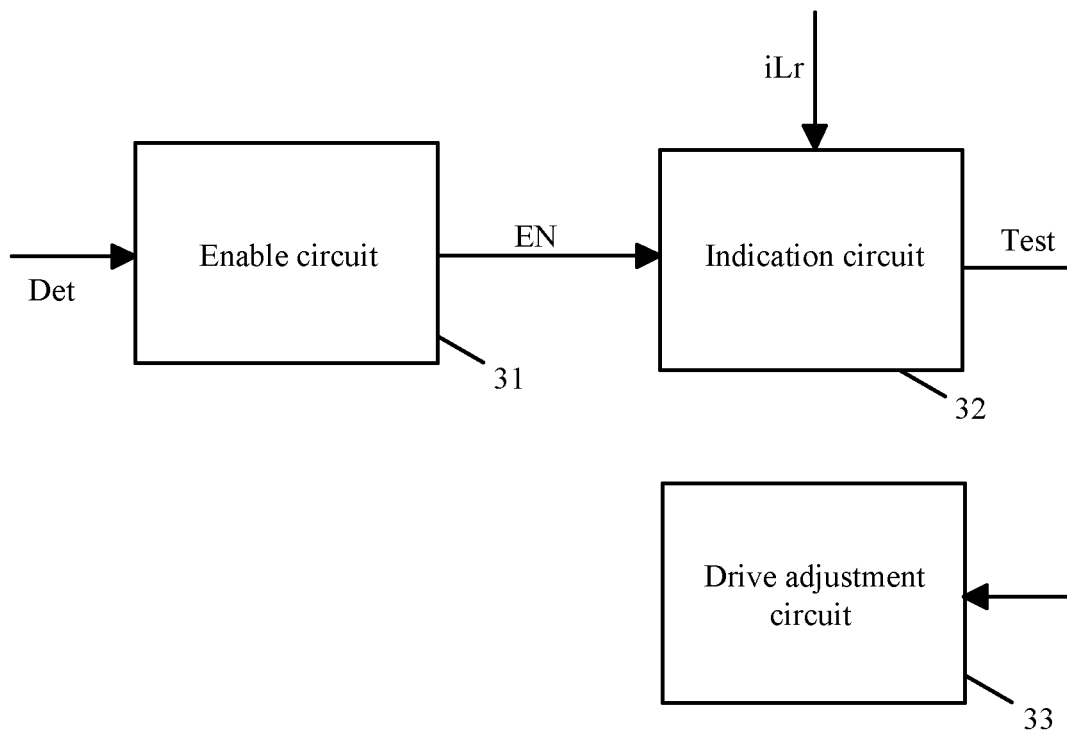
FIG. 3 is circuit diagram of an example detection control circuit, in accordance with embodiments of the present invention.

Referring now to FIG. 3, shown is a schematic block diagram of an example detection control circuit, in accordance with embodiments of the present invention. In this particular example, the detection control circuit can include enable circuit 31, indication circuit 32, and drive adjustment circuit 33. For example, enable circuit 31 can generate enable signal EN to allow the resonant converter to enter the resonant period detection mode. Since the resonant frequency is related to resonant inductance Lr and resonant capacitor Cr, these parameters can change due to changes in the operation environment during the operation process of the resonant converter, such that after a period of operation, the switching frequency may actually not be equal to the resonant frequency. Therefore, the control circuit can detect a new resonant period at regular intervals. In this way, enable signal EN can be set to be active every preset time, in order to update the resonant period each preset time.

When the zero-crossing point of resonant current iLr is detected for the second time during the conduction time of synchronous rectifier switch SR1, enable signal EN can be inactive, which may indicate that the detection for the resonant period is completed. Indication circuit 32 can generate indication signal Test that indicates that the resonant period detection mode is currently entered, in order to adjust the conduction time of the power switch and the synchronous rectifier switch. In this embodiment, indication signal Test can be generated according to resonant current iLr. It should be understood that if resonant current iLr is too small, the detection error for the zero-crossing point can be relatively large, which may affect the accuracy of the detection for the resonant period. Therefore, when enable signal EN is active and resonant current iLr is greater than preset threshold Iref, indication signal Test can be active, thus indicating that the resonant period detection mode is currently entered. That is, the detection for the resonant period may be performed when enable signal EN is active and the resonant current is greater than the preset threshold. When the current switching period ends, indication signal Test can be inactive. Further, when synchronous rectifier switch Q2 is turned off, indication signal Test can be inactive, and the resonant period detection mode may end.

Drive adjustment circuit 33 can adjust the conduction time of the power switch and the synchronous rectifier switch in the resonant period detection mode. Further, when entering the resonant period detection mode (e.g., when indication signal Test is active), drive adjustment circuit 33 can shield drive signals Vgs1, Vgs2, Vgr1, and Vgr2 generated by drive circuit 4, such that the conduction time of power switches Q1 and Q2 and the conduction time of synchronous rectifier switches SR1 and SR2 are no longer controlled by drive circuit 4, as in the normal operation mode.

When the zero-crossing point of the resonant current is detected for the second time (e.g., when zero crossing detection signal Det is inactive), drive adjustment circuit 33 can control synchronous rectifier switch SR1 to turn off after holding time Th, and control power switch Q1 to turn off after the dead time. After that, power switch Q2 and synchronous rectifier switch SR2 can be controlled to be turned on after the dead time, and the conduction time of power switch Q2 and synchronous rectifier switch SR2 may be equal to the conduction time of power switch Q1 and synchronous rectifier switch SR1, respectively. When synchronous rectifier switch SR2 is turned off, indication signal Test can be inactive. In this way, the converter can operate normally, and power switches Q1 and Q2 and synchronous rectifier switches SR1 and SR2 may be controlled by the drive signals generated by drive circuit 4.

It should be understood that the foregoing embodiment detects the interval between two zero-crossing moments of the resonant current during the conduction period of the synchronous rectifier switch SR1, in order to obtain the resonant period. It can also be detected during the conduction period of synchronous rectifier switch SR2, whereby zero-crossing detection signal Det is active when resonance current iLr is less than zero. Zero-crossing detection signal Det can be inactive when resonance current iLr is greater than zero, and timing signal 22 can be controlled to start counting when synchronous rectifier switch SR2 is turned on and zero-crossing detection signal Det is active. The adjustment logic and the principle is similar to the above description.

The resonant period detection mode can be entered each preset time to adjust the conduction time of the power switch and the synchronous rectifier switch, such that the resonant current crosses zero twice within the conduction time of the synchronous rectifier switch, thereby detecting the resonance period in real-time. This detection method may not cause deviation due to the parameter deviation of the resonant element, and can ensure that the resonant frequency can be accurately detected under any circumstances, such that the resonant converter operates in an optimal state by controlling the switching frequency of the resonant converter to be equal to the resonant frequency.

Figure 4:
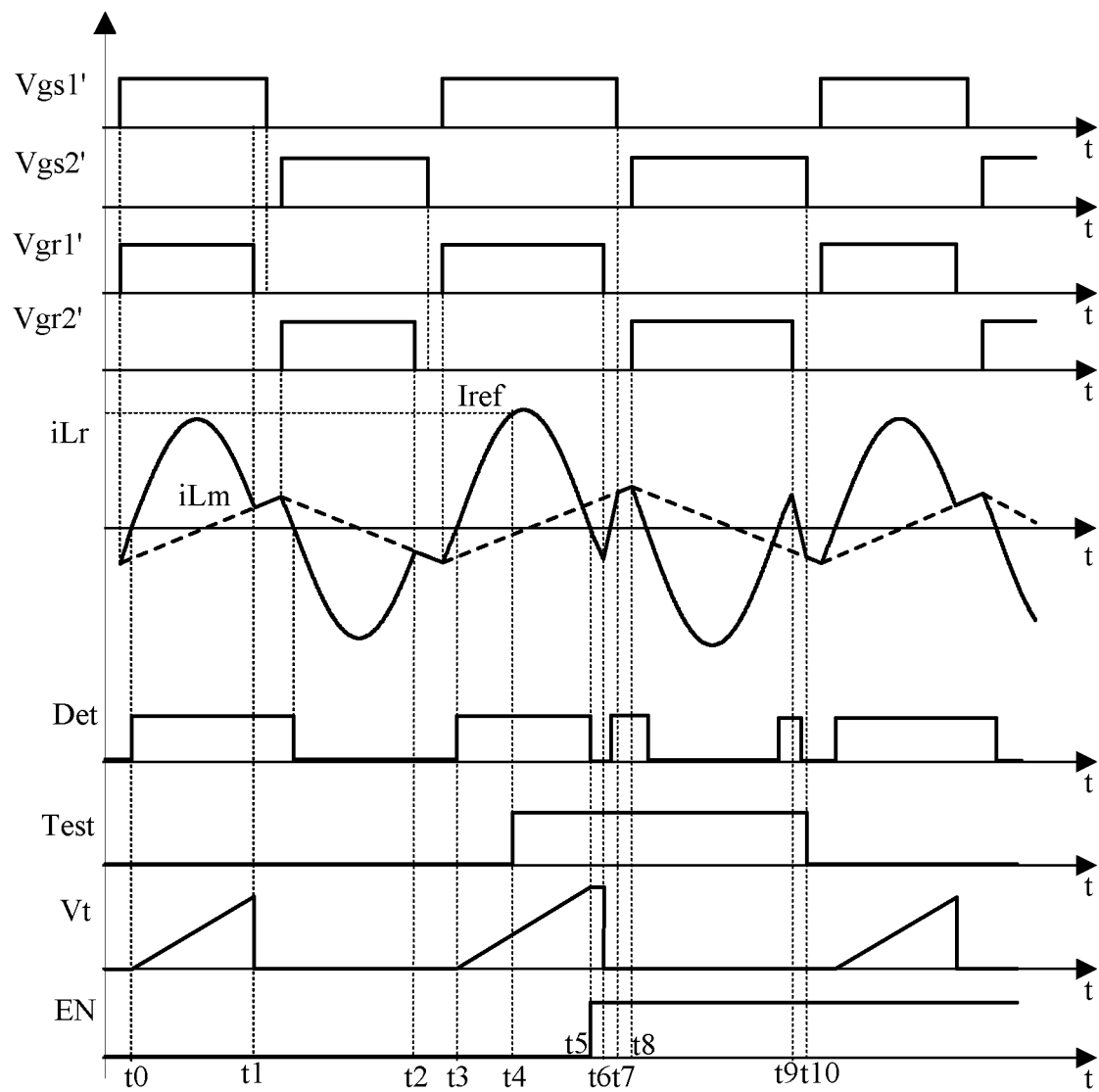
FIG. 4 is a waveform diagram of example operation of a resonant converter, in accordance with the embodiments of this invention.

Referring now to FIG. 4, shown is a waveform diagram of example resonant converter operation, in accordance with embodiments of the present invention. This example synchronous rectifier switch is turned off in advance of the corresponding power switch by a dead time. This figure shows drive signals Vgs1', Vgs2', Vgr1', Vgr2' corresponding to power switches Q1 and Q2 and synchronous rectifier switches SR1 and SR2, resonance current iLr, excitation current iLm, zero-crossing detection signal Det, indication signal Test, timing signal Vt, and enable signal EN. Before time t0, enable signal EN can be active (e.g., low level), which can indicate that the resonant converter is allowed to enter the resonant period detection mode, and power switch Q1 and synchronous rectifier switch SR1 can be turned on.

At time t0, resonant current iLr may decrease to zero in the reverse direction, zero-crossing detection signal Det can be active (e.g., high level), and timing circuit 22 can be triggered by the rising edge of zero-crossing detection signal Det to start counting from zero, such that timing signal Vt gradually increases from zero. Further, resonant current iLr may also gradually increase, but can remain less than the preset threshold, such that indication signal Test remains inactive. That is, although the resonant converter is allowed to enter the resonant period detection mode, the resonant converter may remain in the normal operation mode because the resonant current is not large enough at this time. It should be understood that if the influence of the resonance current on the zero-crossing detection is not considered, the preset threshold can be set smaller, such that the resonance period detection mode will be entered in the first switching period when enable signal EN is active.

When synchronous rectifier switch SR1 is turned off (e.g., at time t1), timing circuit 22 may stop counting and clear to zero. At this time, resonance current iLr can be equal to excitation current iLm, and the current flowing through synchronous rectifier switch SR1 in the secondary side can be zero. After the dead time, power switch Q1 may be turned off. After the dead time has elapsed, power switch Q2 and synchronous rectifier switch SR2 can be controlled to be turned on at the same time, and resonant current iLr may begin to decrease. When resonant current iLr is less than zero, zero-crossing detection signal Det can be inactive (e.g., low level).

At time t2, synchronous rectifier switch SR2 can be turned off, and after the dead time power switch Q2 may be turned off. After the dead time has elapsed, power switch Q1 and synchronous rectifier switch SR1 can be turned on again at the same time. After that, resonant current iLr may inversely decrease to zero at time t3, such that zero-crossing detection signal Det is active, and timing circuit 22 starts counting from zero again. After that, resonant current iLr can continue to increase. At time t4, resonant current iLr may be greater than preset threshold Iref, and indication signal Test can be active, thus indicating that the resonant period detection mode has been entered and the drive signals generated by drive circuit 4 are shielded. At time t5, resonant current iLr may decrease to zero, such that zero-crossing detection signal Det becomes inactive, and timing circuit 22 can keep the current count value unchanged and transmit it to resonant period generation circuit 23. Further, enable signal EN can be inactive, which may indicate that the resonant period detection is no longer performed. After holding time Th, synchronous rectifier switch SR1 can be controlled to be turned off at time t6, and timing circuit 22 may also be cleared, such that timing signal Vt becomes zero.

As compared with the previous switching period, the conduction time of synchronous rectifier switch SR1 has increased. After the dead time, power switch Q1 can be controlled to be turned off at time t7. After the dead time, at time t8, the drive adjustment circuit can control power switch Q2 and synchronous rectifier switch SR2 to be turned on at the same time. The conduction time of power switch Q2 and synchronous rectifier switch SR2 can be the same as that of power switch Q1 and synchronous rectifier switch SR1, respectively. At time t9, synchronous rectifier switch SR2 can be controlled to be turned off, and after the dead time, power switch Q2 may be controlled to be turned off at time t10. At this time, indication signal Test can be inactive, the resonant period detection mode may end, and the resonant converter can enter the normal operation mode. Afterwards, the resonant period generation circuit may have received timing signal Vt transmitted by the timing circuit, thereby generating resonant period Tr. Further, drive circuit 4 can adjust the switching period to be equal to the resonance period according to the updated resonance period, and may generate drive signals according to the switching period to control the normal operation of the resonant converter.

Figure 5:
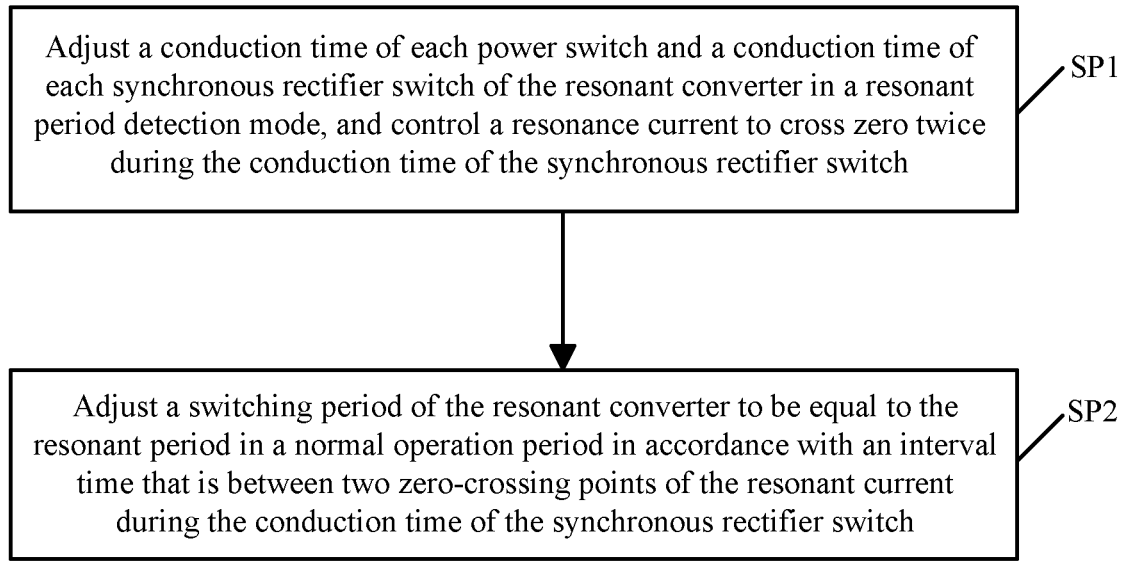
FIG. 5 is a flow diagram of an example method of controlling a resonant converter, in accordance with embodiments of the present invention.

Referring now to FIG. 5, shown is a flow diagram of an example method of controlling a resonant converter, in accordance with embodiments of the present invention. This example control method can include, at SP1, adjusting a conduction time of at least one power switch and a conduction time of at least one synchronous rectifier switch of the resonant converter in a resonant period detection mode, controlling a resonance current to crosses zero twice during the conduction time of the synchronous rectifier switch, and obtaining a resonant period of the resonant converter. At SP2, a switching period of the resonant converter may be adjusted to be equal to the resonant period in a normal operation period in accordance with an interval time that is between two zero-crossing points of the resonant current during the conduction time of the synchronous rectifier switch. Further, the resonant converter can be controlled to enter the resonant period detection mode each preset time.

In some embodiments, when the resonant current is greater than a preset threshold, the resonant converter can be controlled to enter the resonant period detection mode and remain therein until the end of the current switching period. Further, the obtaining the resonant period of the resonant converter can include detecting a zero-crossing point of the resonant current, starting counting when the resonant current crosses zero during the conduction time of the synchronous rectifier switch, and stopping counting when the resonant current crosses zero again during the conduction time of the synchronous rectifier switch. The count value may be cleared when the synchronous rectifier switch is turned off.

Further, the adjusting a conduction time of each power switch and a conduction time of each synchronous rectifier switch of the resonant converter can include shielding drive signals for controlling each power switch and each synchronous rectifier switch when entering the resonant period detection mode, and controlling one corresponding synchronous rectifier switch to be turned off after a holding time elapses when a zero-crossing point of the resonant current is detected for the second time during the conduction time of the corresponding synchronous rectifier switch.

The resonant period detection mode may be entered every preset time to adjust the conduction time of each power switch and the conduction time of each synchronous rectifier switch, such that the resonant current crosses zero twice within the conduction time of the synchronous rectifier switch, thereby detecting the resonance period in real-time. This detection method may not cause deviation due to the parameter deviation of the resonant element, and can ensure that the resonant frequency can be accurately detected under any circumstances, such that the resonant converter operates in an optimal state by controlling the switching frequency of the resonant converter to be equal to the resonant frequency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a resonant converter, wherein the control circuit is configured to:
   a) adjust a conduction time of one power switch and a conduction time of one corresponding synchronous rectifier switch in the resonant converter in a resonant period detection mode;
   b) control a resonance current to cross zero twice during the conduction time of the synchronous rectifier switch; and
   c) obtain a resonant period of the resonant converter,
   d) wherein the control circuit is configured to adjust a switching period of the resonant converter to be equal to the resonant period in a normal operation period in accordance with an interval time that is between two zero-crossing points of the resonant current during the conduction time of the synchronous rectifier switch.

2. The control circuit of claim 1, wherein the switching period is twice the interval time.

3. A resonant converter, comprising the control circuit of claim 1, and further comprising:
   a) a main power topology comprising at least one power switch;
   b) a resonant network configured to generate the resonant current; and
   c) a rectifier circuit comprising at least one synchronous rectifier switch.

4. The resonant converter of claim 3, wherein the main power topology comprises first and second power switches coupled in series between an input voltage and a reference ground of the resonant converter.

5. The resonant converter of claim 4, wherein the rectifier circuit comprises a transformer and first and second synchronous rectifier switches that form a full-wave rectifier circuit.

6. The resonant converter of claim 5, wherein:
   a) the first power switch and the first synchronous rectifier switch are turned on at the same time, the first synchronous rectifier switch is turned off by a dead time earlier than the first power switch; and
   b) the second power switch and the second synchronous rectifier switch are turned on at the same time, and the second synchronous rectifier switch is turned off by a dead time earlier than the second power switch.

7. The resonant converter of claim 4, wherein a sum of the conduction time and a dead time of the first power switch is half of the switching period, and a sum of the conduction time and a dead time of the second power switch is half of the switching period.

8. A control circuit for a resonant converter, wherein the control circuit is configured to:
   a) adjust a conduction time of one power switch and a conduction time of one corresponding synchronous rectifier switch in the resonant converter in a resonant period detection mode;
   b) control a resonance current to cross zero twice during the conduction time of the synchronous rectifier switch; and
   c) obtain a resonant period of the resonant converter,
   d) wherein the control circuit comprises a resonant period detection circuit configured to obtain the resonant period of the resonant converter;
   e) wherein the control circuit comprises a detection control circuit configured to control the resonant converter to enter the resonant period detection mode, and to adjust the conduction time of the power switch and the conduction time of the synchronous rectifier switch; and
   f) wherein the control circuit comprises a drive circuit configured to receive the resonant period detected by the resonant period detection circuit, and to generate drive signals for controlling the power switch and the synchronous rectifier switch, in order to control a switching period of the resonant converter to be equal to the resonant period.

9. The control circuit of claim 8, wherein the resonant period detection circuit comprises a zero-crossing detection circuit configured to generate a zero-crossing detection signal representative of a zero-crossing point of the resonant current in accordance with the resonant current.

10. The control circuit of claim 8, wherein the resonant period detection circuit comprises a timing circuit configured to start counting when the resonant current crosses zero during the conduction time of the corresponding synchronous rectifier switch, and to stop counting when the resonant current crosses zero again during the conduction time of the corresponding synchronous rectifier switch.

11. The control circuit of claim 10, wherein the timing circuit clears a count value when the corresponding synchronous rectifier switch is turned off.

12. The control circuit of claim 10, wherein the resonant period detection circuit comprises a resonant period generation circuit configured to receive a count value generated by the timing circuit in the resonant period detection mode, and to obtain the current resonant period according to the count value.

13. The control circuit of claim 8, wherein the detection control circuit comprises an enable circuit configured to generate an enable signal every preset time to allow the resonant converter to enter the resonant period detection mode.

14. The control circuit of claim 13, wherein the detection control circuit comprises an indication circuit configured to generate an indication signal to indicate that the resonant period detection mode is currently entered, in order to adjust the conduction time of the power switch and the conduction time of the synchronous rectifier switch in the resonant converter.

15. The control circuit of claim 14, wherein:
a) when the enable signal is active and the resonant current is greater than a preset threshold, the indication signal is activated to indicate that the resonant period detection mode has been entered; and
b) the indication signal remains active until the end of the current switching period, and then goes inactive to indicate that the resonant period detection mode has ended.

16. The control circuit of claim 8, wherein the detection control circuit comprises a drive adjustment circuit configured to adjust the conduction time of the power switch and the conduction time of the corresponding synchronous rectifier switch in the resonant period detection mode.

17. The control circuit of claim 16, wherein in the resonant period detection mode, the drive adjustment circuit is configured to:
a) shield drive signals generated by the drive circuit; and
b) when a zero-crossing point of the resonant current is detected for the second time during the conduction time of the corresponding synchronous rectifier switch, the corresponding synchronous rectifier switch is controlled to be turned off after a holding time elapses.

18. A method of controlling a resonant converter, the method comprising:
a) adjusting a conduction time of one power switch and a conduction time of a corresponding synchronous rectifier switch in the resonant converter in a resonant period detection mode;
b) controlling a resonance current to cross zero twice during the conduction time of the synchronous rectifier switch;
c) obtaining a resonant period of the resonant converter; and
d) adjusting a switching period of the resonant converter to be equal to the resonant period in a normal operation period in accordance with an interval time that is between two zero-crossing points of the resonant current during the conduction time of the synchronous rectifier switch.

19. The method of claim 18, further comprising controlling the resonant converter to enter the resonant period detection mode every preset time.

20. The method of claim 18, wherein the adjusting a conduction time of one power switch and a conduction time of a corresponding synchronous rectifier switch of the resonant converter comprises:
a) shielding drive signals for controlling the power switch and the corresponding synchronous rectifier switch in the resonant period detection mode; and
b) controlling the synchronous rectifier switch to be turned off after a holding time elapses when a zero-crossing point of the resonant current is detected for the second time during the conduction time of the corresponding synchronous rectifier switch.

* * * * *